US012650622B2

(12) United States Patent
Chiu et al.

(10) Patent No.: US 12,650,622 B2
(45) Date of Patent: Jun. 9, 2026

(54) BACKLIGHT MODULE AND DISPLAY DEVICE

(71) Applicant: AUO Corporation, Hsinchu City (TW)

(72) Inventors: Min-Hsuan Chiu, Hsinchu City (TW);
Wei-Ming Cheng, Hsinchu City (TW);
Chao-Min Yang, Hsinchu City (TW)

(73) Assignee: AUO Corporation, Hsinchu City (TW)

( * ) Notice: Subject to any disclaimer, the term of this patent is extended or adjusted under 35 U.S.C. 154(b) by 0 days.

(21) Appl. No.: 19/036,095

(22) Filed: Jan. 24, 2025

(65) Prior Publication Data

US 2026/0063949 A1      Mar. 5, 2026

(30) Foreign Application Priority Data

| Sep. 2, 2024 | (TW) | ................................. | 113133062 |
| Dec. 17, 2024 | (TW) | ................................. | 113149232 |

(51) Int. Cl.
| *G02F 1/1335* | (2006.01) |
| *F21V 8/00* | (2006.01) |
| *G02F 1/13357* | (2006.01) |

(52) U.S. Cl.
CPC ..... *G02F 1/133607* (2021.01); *G02B 6/0025* (2013.01); *G02B 6/0055* (2013.01); *G02F 1/133603* (2013.01)

(58) Field of Classification Search
CPC ......... G02F 1/133607; G02F 1/133603; G02F 1/1323; G02F 1/133769; G02F 1/133738; G02F 1/133742; G02F 1/133627; G02B 6/0025; G02B 6/0055; G02B 30/31; G02B 30/32; G02B 30/33; G02B 30/30; G02B 6/00; G02B 6/0076; G02B 6/0088
See application file for complete search history.

(56) References Cited

U.S. PATENT DOCUMENTS

| 12,130,463 B2 | 10/2024 | Zhang et al. |
| 2024/0126001 A1 | 4/2024 | Chiu et al. |
| 2024/0295686 A1 | 9/2024 | Chen et al. |

FOREIGN PATENT DOCUMENTS

| CN | 115981052 A | 4/2023 | |
| CN | 219285559 U | * 6/2023 | ........... G02B 6/0053 |

(Continued)

OTHER PUBLICATIONS

Search English translation of CN 116560134 A (Year: 2023).*

(Continued)

*Primary Examiner* — Omar Rojas Cadima
(74) *Attorney, Agent, or Firm* — WPAT, PC

(57) ABSTRACT

A backlight module includes a switching control unit, a first light source unit disposed below the switching control unit and including a first light source and a first light guide, a second light source unit disposed between the switching control unit and the first light source unit and including a second light source and a second light guide, and a first prism film disposed at a light exit side of the first light guide. In a privacy mode, the second light source is turned off, the first light source is turned on, and the switching control unit modulates light passing the first prism film, so the backlight module has a first light output range. In a share mode, the second light source is turned on, and the switching control unit is deactivated, so the backlight module has a second light output range larger than the first light output range.

19 Claims, 14 Drawing Sheets

6

(56) References Cited

FOREIGN PATENT DOCUMENTS

| CN | 116560134 A | * | 8/2023 | ....... | G02F 1/133531 |
| WO | WO2023178674 A1 | | 9/2023 | | |

OTHER PUBLICATIONS

Search English translation of CN-219285559-U (Year: 2023).*

TIPO (Taiwan Intellectual Property Office ) has issued the Office Action for the corresponding Taiwan application on Nov. 25, 2025.

* cited by examiner

4

5

6

BACKLIGHT MODULE AND DISPLAY DEVICE

CROSS-REFERENCE TO RELATED APPLICATION

This application claims the priority benefits of Taiwan patent application serial no. 113133062, filed on Sep. 2, 2024 and Taiwan patent application serial no. 113149232, filed on Dec. 17, 2024. The entirety of the mentioned above patent applications is hereby incorporated by reference herein and made a part of this specification.

BACKGROUND OF THE DISCLOSURE

1. Field of the Disclosure

The disclosure is related to a backlight module; more specifically, the disclosure is related to a backlight module capable of switching the light output mode and a display device having the backlight module.

2. Related Art

In general, conventional display devices achieve the anti-peeping effect by installing the anti-peeping film to filter out lights of larger angles. However, installing the anti-peeping film usually impairs the display quality and brightness, so the output power of the light sources should be increased to achieve the desired brightness requirement. Moreover, the anti-peeping film usually cannot satisfy the local anti-peeping effect.

SUMMARY OF THE DISCLOSURE

It is an object of the disclosure to provide a backlight module, which can be switched between the privacy mode and the share mode.

In an embodiment, the disclosure provides a backlight module including a switching control unit, a first light source unit, a second light source unit, and a first prism film, wherein the first light source unit is disposed below the switching control unit and includes a first light source and a first light guide; the second light source unit is disposed between the switching control unit and the first light source unit and includes a second light source and a second light guide; the first prism film is disposed at a light exit side of the first light guide. In a privacy mode, the second light source is turned off, the first light source is turned on, and the switching control unit is activated to modulate light passing the first prism film from the first light source unit, so the backlight module has a first light output range. In a share mode, the second light source is turned on, and the switching control unit is deactivated, so the backlight module has a second light output range larger than the first light output range.

In an embodiment, in the share mode, the first light source is turned on, and the second light output range is constituted by lights from the first light source unit and the second light source unit.

In an embodiment, the first prism film has a plurality of first prism strips extending along a first direction.

In an embodiment, the backlight module further includes a second prism film. The second prism film has a plurality of second prism strips extending along a second direction. The second direction is substantially perpendicular to the first direction.

In an embodiment, the second prism film is disposed at the light exit side of the first light guide and located between the first light guide and the second light guide.

In an embodiment, the second prism film is disposed at a light exit side of the second light guide.

In an embodiment, the backlight module further includes a reflective layer. The reflective layer is disposed at a side of the first light guide opposite to the light exit side.

In an embodiment, the backlight module further includes an optical film disposed at the light exit side of the first light guide.

In an embodiment, the second light source includes a first sub-light source and a second sub-light source. The switching control unit includes a first modulation region and a second modulation region corresponding to the first sub-light source and the second sub-light source, respectively. In a partial privacy mode, the first light source is turned on, the first sub-light source is selectively turned on or off, the second sub-light source is turned off, and the switching control unit is deactivated at the first modulation region and activated at the second modulation region, so the backlight module has a third light output range substantially corresponding to the first modulation region and a fourth light output range substantially corresponding to the second modulation region, and the fourth light output range is smaller than the third light output range.

In an embodiment, in the partial privacy mode, the first sub-light source is turned on to increase the third light output range.

In an embodiment, a brightness ratio of the first light source to the second light source is 2:1.

It is another object of the disclosure to provide a backlight module including a switching control, a first light source unit, a second light source unit, and a first prism film. The switching control unit has a first modulation region and a second modulation region. The first light source unit is disposed below the switching control unit and includes a first light source and a first light guide. The second light source unit is disposed between the switching control unit and the first light source unit. The second light source unit includes a second light source and a second light guide. The second light source includes a first sub-light source and a second sub-light source corresponding to the first modulation region and the second modulation region, respectively. The first prism film is disposed at a light exit side of the first light guide. In a partial privacy mode, the first light source is turned on, the first sub-light source is selectively turned on or off, the second sub-light source is turned off, and the switching control unit is deactivated at the first modulation region and activated at the second modulation region, so the backlight module has a share light output range substantially corresponding to the first modulation region and a privacy light output range substantially corresponding to the second modulation region, and the privacy light output range is smaller than the share light output range.

In another embodiment, the disclosure provides a display device including a display panel and the backlight module described above. The display panel has a display surface, and the backlight module is disposed at a side of the display panel opposite to the display surface.

Compared with the prior art, in the share mode, the backlight module of the disclosure can provide a much more uniform brightness-angle distribution to effectively improve the power consumption. Moreover, in the privacy mode, the backlight module of the disclosure can provide a much more concentrated brightness-angle distribution to effectively enhance the anti-peeping effect. In addition, the backlight module of the disclosure can provide a local anti-peeping effect by modulating the control of the switching control unit and the light sources.

BRIEF DESCRIPTION OF THE DRAWINGS

FIG. 8A-1 and FIG. 8A-2 are schematic views of the light output range of the display device and the backlight module thereof of FIG. 8 in different partial privacy modes.

DETAILED DESCRIPTION OF THE PREFERRED EMBODIMENT

Figure 1:
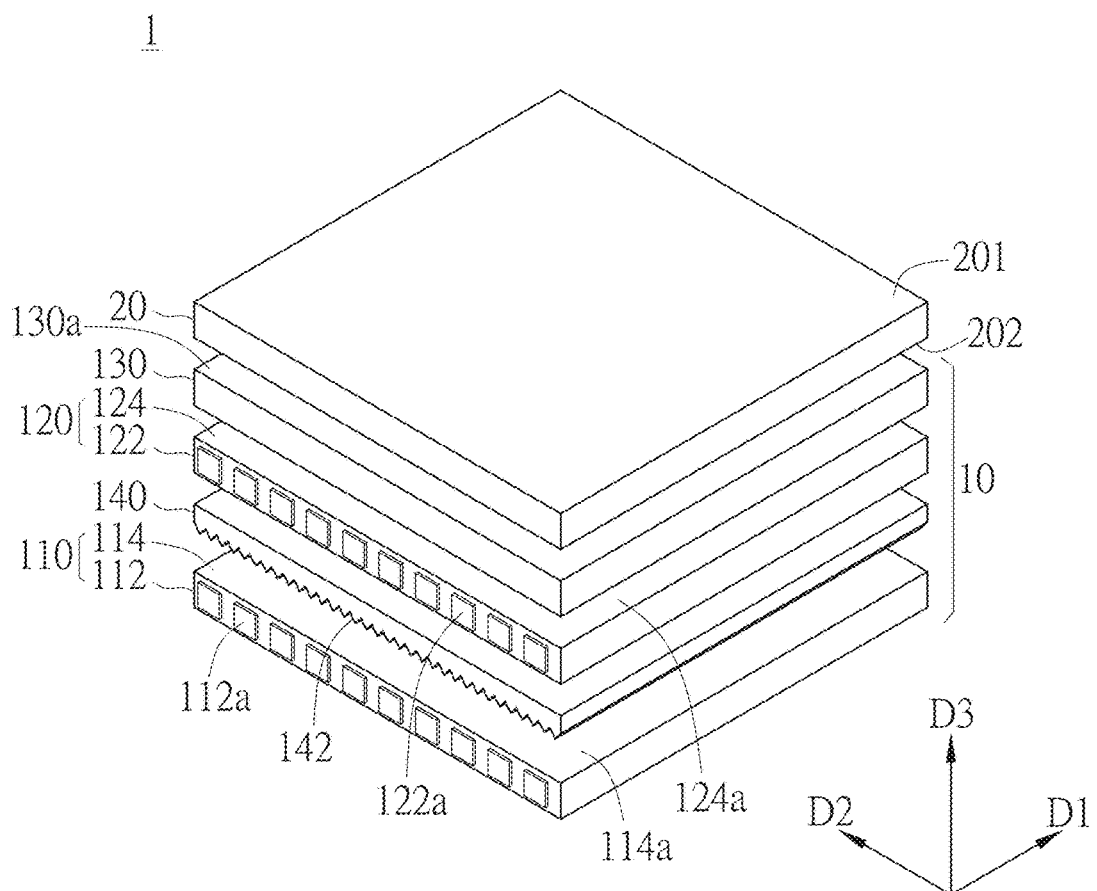
FIG. 1 is a schematic perspective view of the display device and the backlight module thereof in a first embodiment of the disclosure.

In the drawings, the thickness of layers, films, panels, regions, etc., are exaggerated for clarity. Throughout this specification, the same reference symbols refer to the same elements. It will be understood that when an element such as a layer, film, region or substrate is referred to as being "on" or "connected to" another element, it can be directly on or connected to the other element, or Intermediate elements may also be present. In contrast, when an element is referred to as being "directly on" or "directly connected to" another element, there are no intervening elements present. As used herein, "connected" may refer to physical and/or electrical connection. Furthermore, "electrical connection" or "coupling" may mean the presence of other components between two components.

It should be understood that, even though the terms such as "first", "second", "third" may be used to describe an element, a part, a region, a layer and/or a portion in the present specification, but these elements, parts, regions, layers and/or portions are not limited by such terms. Such terms are merely used to differentiate an element, a part, a region, a layer and/or a portion from another element, part, region, layer and/or portion. Therefore, in the following discussions, a first element, portion, region, layer or portion may be called a second element, portion, region, layer or portion, and do not depart from the teaching of the present disclosure.

The terminology used herein is for the purpose of describing particular embodiments only and is not intended to be limiting. As used herein, the singular forms "a", "an" and "the" are intended to include the plural forms including "at least one" unless the content clearly dictates otherwise. "Or" means "and/or". As used herein, the term "and/or" includes any and all combinations of one or more of the associated listed items. It will also be understood that when used in this specification, the terms "comprising" and/or "including" designate the presence or addition of stated features, regions, integers, steps, operations, elements and/or parts, but do not exclude the presence or addition of one or The presence or addition of various other features, regions, integers, steps, operations, elements, parts and/or combinations thereof.

In addition, the relative terms such as "below" or "bottom" and "above" or "top" may be used herein to describe the relationship of one element to another, as illustrated. It will be understood that the relative terms are intended to encompass different orientations of the device in addition to the orientation shown in the drawings. For example, if the device in the drawings is turned over, the elements described as being "below" the other elements will be oriented on the "upper" side of the other elements. Therefore, the exemplary term "below" may encompass the orientation of "below" and "above" depending on the particular orientation of the drawing. Similarly, if the device in the drawings is turned over, the elements described as being "above" the other elements will be oriented on the "lower" side of the other elements. Therefore, the exemplary term "above" may encompass the orientation of "above" and "below" depending on the particular orientation of the drawing.

"About", "approximately" or "substantially" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, ±20%, ±10%, ±5% of the stated value. Moreover, "about", "approximately" or "substantially" as used herein may select a more acceptable range of deviation or standard deviation depending on optical properties, etching properties, or other properties, without applying a standard deviation for all properties.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

The disclosure provides a backlight module, which can be applied to a display device, so the display device can have a switchable display mode (e.g. the privacy mode or the share mode) through different light output modes of the backlight module, but not limited thereto. Hereinafter, with reference to the drawings, the display device and the backlight module of the disclosure will be described in detail.

Referring to FIG. 1, FIG. 1 is a schematic perspective view of the display device 1 and the backlight module 10 thereof in a first embodiment of the disclosure. As shown in FIG. 1, the display device 1 includes the backlight module 10 and a display panel 20. The display panel 20 can be any suitable display panel, such as a liquid crystal display panel, which requires the backlight module 10 as the backlight source, but not limited thereto. The backlight module 10 is disposed at a side of the display panel 20 opposite to the display surface 201. For example, taking the display surface 201 of the display panel 20 as the front side, the backlight module 10 is disposed at the back side 202 of the display panel 20.

Figure 1A:
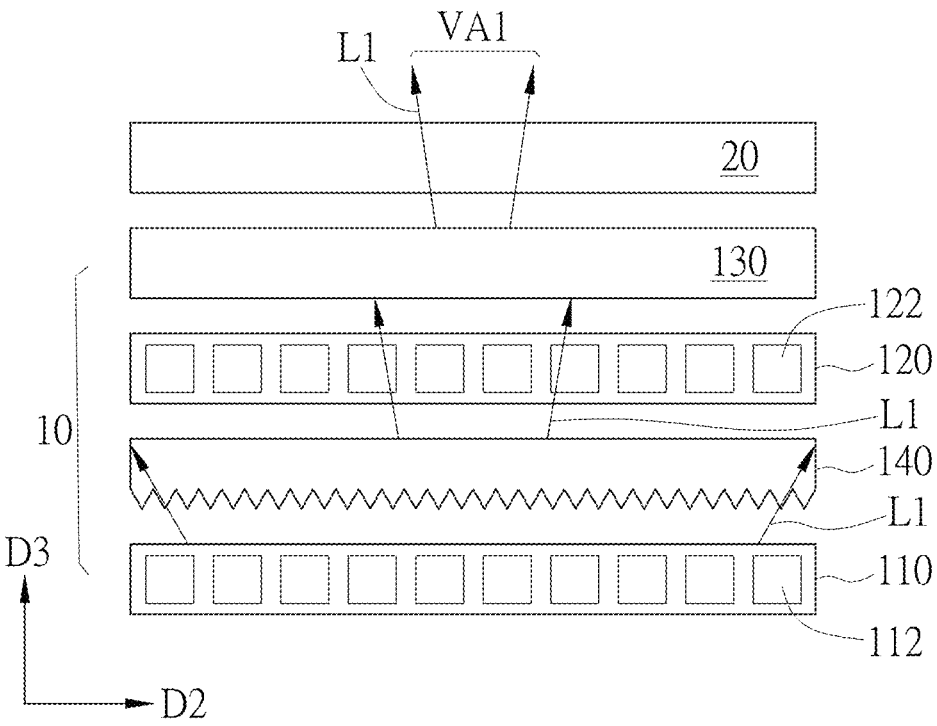
FIG. 1A and FIG. 1B are schematic views of the light output range of the display device and the backlight module thereof of FIG. 1 in the privacy mode and the share mode, respectively.
Figure 1B:
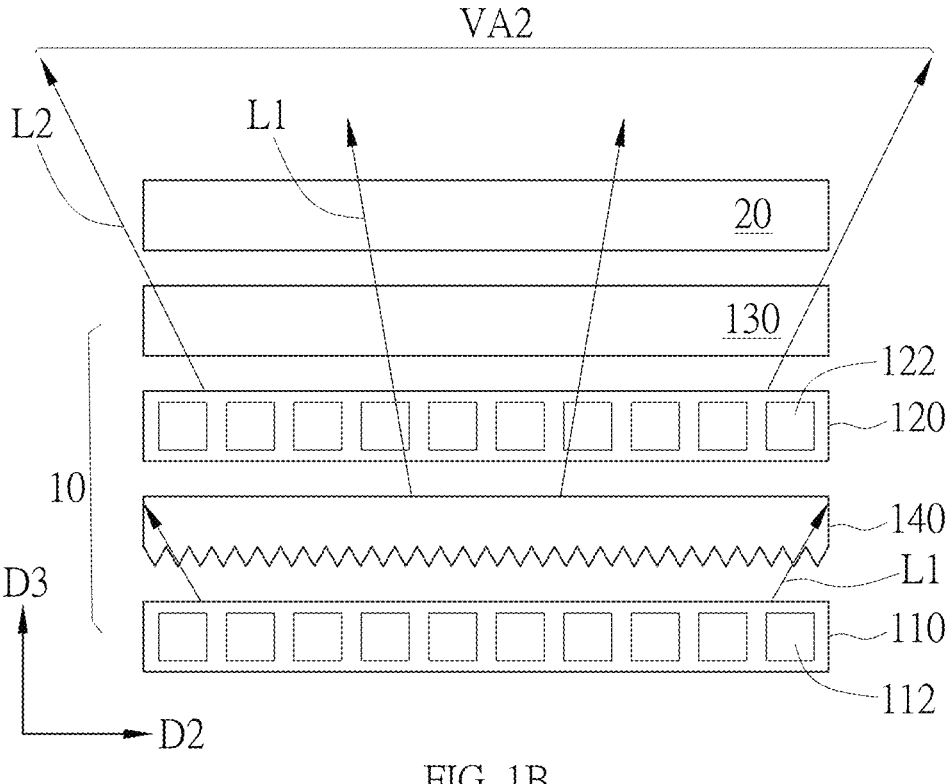

As shown in FIG. 1, the backlight module 10 includes a switching control unit 130, a first light source unit 110, a second light source unit 120, and a first prism film 140. The first light source unit 110 is disposed below the switching control unit 130 and includes a first light source 112 and a first light guide 114. The second light source unit 120 is disposed between the switching control unit 130 and the first light source unit 110 and includes a second light source 122 and a second light guide 124. The first prism film 140 is disposed at the light exit side 114a of the first light guide 114. In the privacy mode (as shown in FIG. 1A), the second light source 122 is turned off, the first light source 112 is turned on, and the switching control unit 130 is activated to modulate light passing the first prism film 140 from the first light source unit 110, so the backlight module 10 has a first light output range (e.g. VA1). In the share mode (as shown in FIG. 1B), the second light source 122 is turned on, and the switching control unit 130 is deactivated, so the backlight module 10 has a second light output range (e.g. VA2), and the second light output range is larger than the first light output range.

Specifically, the first light source 112 is preferably a light bar constituted by a plurality of light-emitting components 112a and a circuit board (not shown). For example, the light-emitting components 112a can be light-emitting elements (LEDs) or micro LEDs. The light-emitting components 112a are disposed on and electrically connected to a flexible circuit board to constitute the first light source 112 of a strip shape, but not limited thereto. The first light source 112 is preferably disposed at a side of the first light guide 114 to form a side lighting structure. Specifically, the first light guide 114 can be a rectangular plate, which extends along the first direction D1 and the second direction D2 (i.e., the first direction D1 is perpendicular to the second direction D2). The first light guide 114 preferably has a size corresponding to the display panel 20. The first light source 112 can be disposed along the second direction D2 and configured to emit light toward the first direction D1 into the first light guide 114. For example, in the display device 1, the first direction D1 can be a vertical viewing angle direction, the second direction D2 can be a horizontal viewing angle direction, and the third direction D3 can be a display direction (or the light output direction of the backlight module (e.g. 10)). In this embodiment, the plurality of light-emitting components 112a of the first light source 112 are disposed along the horizontal viewing angle direction at the bottom side of the first light guide 114 (i.e., at the lower side of the vertical viewing angle direction), so light emitted from the plurality of light-emitting components 112a can enter the first light guide 114 from the bottom side of the first light guide 114, but not limited thereto. In practical applications, the first light source 112 can be disposed at one or more sides of the first light guide 114, such as left side and/or right side of the horizontal viewing angle direction and/or upper side and/or lower side of the vertical viewing angle direction.

The second light source unit 120 can have a structure the same as or similar to the first light source unit 110. Specifically, the second light source 122 is preferably a light bar constituted by a plurality of light-emitting components 122a and a circuit board (not shown). For example, the light-emitting components 122a can be LEDs or micro LEDs. The light-emitting components 122a are disposed on and electrically connected to a flexible circuit board to constitute the second light source 122 of a strip shape, but not limited thereto. The second light source 122 is preferably disposed at a side of the second light guide 124 to form a side lighting structure. Specifically, the second light guide 124 can be a rectangular plate, which extends along the first direction D1 and the second direction D2 and preferably has a size corresponding to the first light guide 114. The second light source 122 can be disposed along the second direction D2 to emit light toward the first direction D1 into the second light guide 124. For example, the plurality of light-emitting components 122a of the second light source 122 are disposed along the horizontal viewing angle direction (e.g. the second direction D2) at the bottom side of the second light guide 124 (i.e., at the lower side of the vertical viewing angle direction), so light emitted from the plurality of light-emitting components 122a can enter the second light guide 124 from the bottom side of the second light guide 124, but not limited thereto. In practical applications, the second light source 122 can be disposed at one or more sides of the second light guide 124, such as left side and/or right side of the horizontal viewing angle direction and/or upper side and/or lower side of the vertical viewing angle direction. In this embodiment, the first light source 112 and the second light source 122 are preferably disposed at the same side of the first light guide 114 and the second light guide 124, such as the lower side of the vertical viewing angle direction, but not limited thereto. In practical applications, the first light source 112 and the second light source 122 can be disposed at the same side, different sides, or multiple sides of the first light guide 114 and the second light guide 124.

The first prism film 140 is configured to enhance the intensity of light at the center of the backlight module 10. As shown in FIG. 1, the first prism film 140 has a plurality of first prism strips 142, and the first prism strips 142 extend along the first direction D1. Specifically, the plurality of first prism strips 142 are disposed along the second direction D2 and extend along the first direction D1, so light at two sides of the second direction D2 can be concentrated toward the center to provide a better optical effect. For example, taking the extending direction of the prism strips parallel to the horizontal viewing angle direction (e.g. the second direction D2) as 0 degree, the plurality of first prism strips 142 of the first prism film 140 extending along the first direction D1 (e.g. the vertical viewing angle direction) are disposed at 90 degrees, so lights at two sides of the horizontal viewing angle direction will be concentrated toward the center to provide a horizontally concentrated optical effect.

Figure 3:
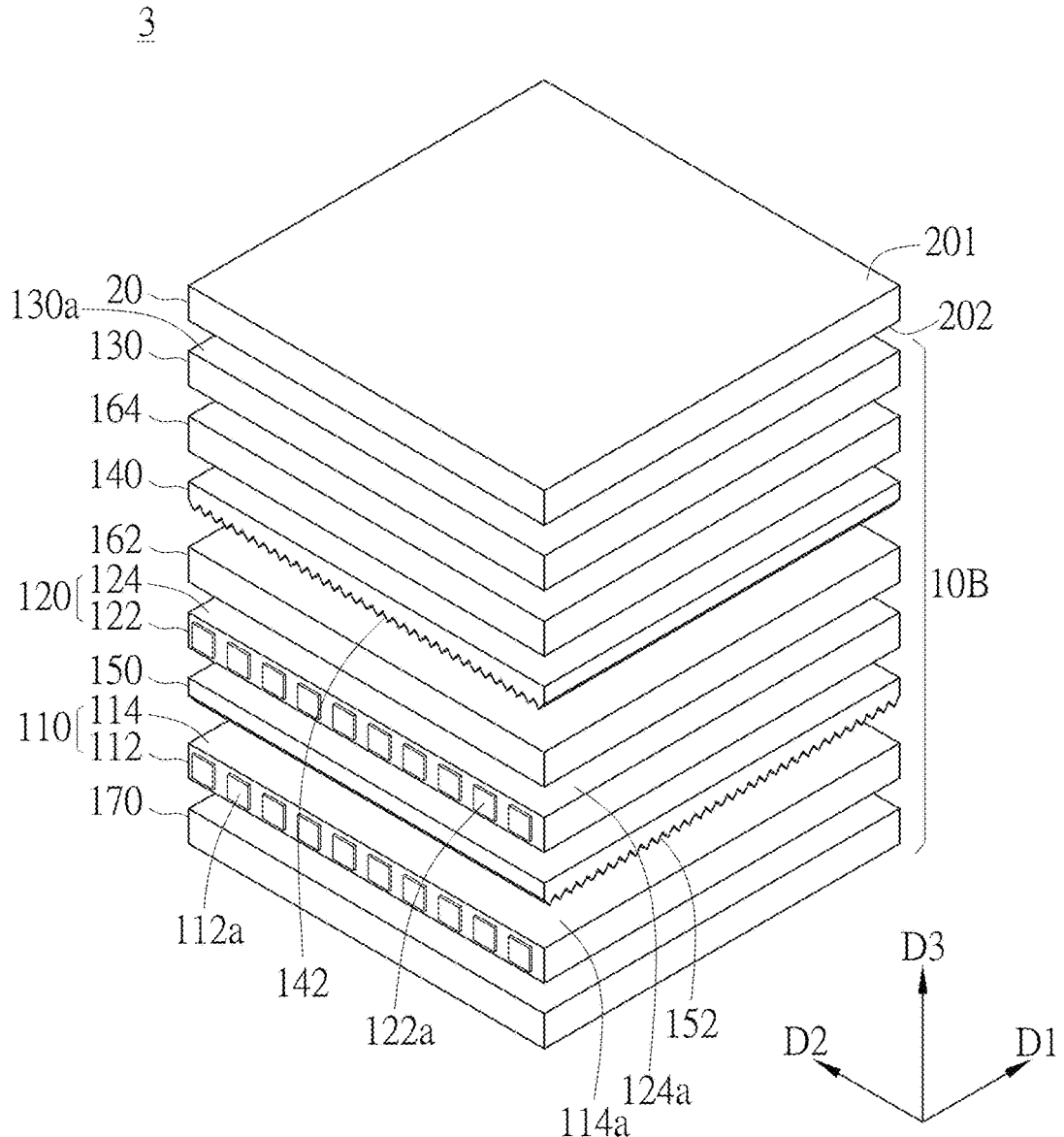
FIG. 3 is a schematic perspective view of the display device and the backlight module thereof in a third embodiment of the disclosure.

As shown in FIG. 1, the switching control unit 130, the second light source unit 120, and the first light source unit 110 are sequentially disposed along the third direction D3, so the switching control unit 130 is relatively closer to the display panel 20, and the first light source unit 110 is relatively farther away from the display panel 20. Specifically, the second light source unit 120 is disposed at the light exit side 114a of the first light guide 114 of the first light source unit 110. The switching control unit 130 is disposed at the light exit side 124a of the second light guide 124 of the second light source unit 120. The display panel 20 is disposed at the light exit side 130a of the switching control unit 130. In this embodiment, the first prism film 140 is preferably disposed at the light exit side 114a of the first light guide 114 and located between the first light guide 114 and the second light guide 124, but not limited thereto. In another embodiment, as shown in FIG. 3, the first prism film 140 can be disposed at the light exit side 124a of the second light guide 124 and located between the second light guide 124 and the switching control unit 130.

Hereinafter, referring to FIG. 1A and FIG. 1B, the light output range of the backlight module 10 in the privacy mode and the share mode will be described in detail. As shown in FIG. 1A, in the privacy mode, the second light source 122 is turned off, and the first light source 112 is turned on. In other words, the light-emitting components 122a of the second light source 122 do not emit light, and only the light-emitting components 112a of the first light source 112 emit light L1. The light L1 of the first light source 112 is directed by the first light guide 114 toward the light output direction (e.g. the third direction D3) into the first prism film 140. With the light concentration function of the first prism film 140, the light L1 enters the switching control unit 130 in a more concentrated manner. In the privacy mode, the switching control unit 130 is activated to modulate the light L1 that passes the first prism film 140 from the first light source unit 110, so the backlight module 10 has a first light output range VA1, which is more concentrated or has a narrower viewing angle.

As shown in FIG. 1B, in the share mode, the second light source 122 is turned on, and the first light source 112 can be turned on or turned off. In this embodiment, the first light source 112 is preferably turned on to increase the light output brightness of the backlight module 10. In other words, the light-emitting components 112a of the first light source 112 emit light L1, and the light-emitting components 122a of the second light source 122 emit light L2. The light L1 from the first light source 112 is directed by the first light guide 114 toward the light output direction (e.g. the third direction D3) into the first prism film 140. With the light concentration function of the first prism film 140, the light L1 enters the switching control unit 130 in a more concentrated manner. The light L2 of the second light source 122 is directed by the second light guide 124 toward the light output direction (e.g. the third direction D3) into the switching control unit 130. In the share mode, the switching control unit 130 is deactivated and does not modulate the light L2 of the second light source unit 120 and the light L1 of the first light source unit 110 that passes the first prism film 140, so the backlight module 10 will has a second light output range VA2, which is relatively diffused or has a wider viewing angle. That is, in the backlight module 10, the second light output range VA2 larger than the first light output range VA1 refers that the viewing angle in the share mode is larger than the viewing angle in the privacy mode. Moreover, in this embodiment, the second light output range VA2 is constituted by the lights from the first light source unit 110 and the second light source unit 120. In the case that the first light source 112 is turned off, the second light output range VA2 is constituted by only the light form the second light source unit 120.

Figure 2:
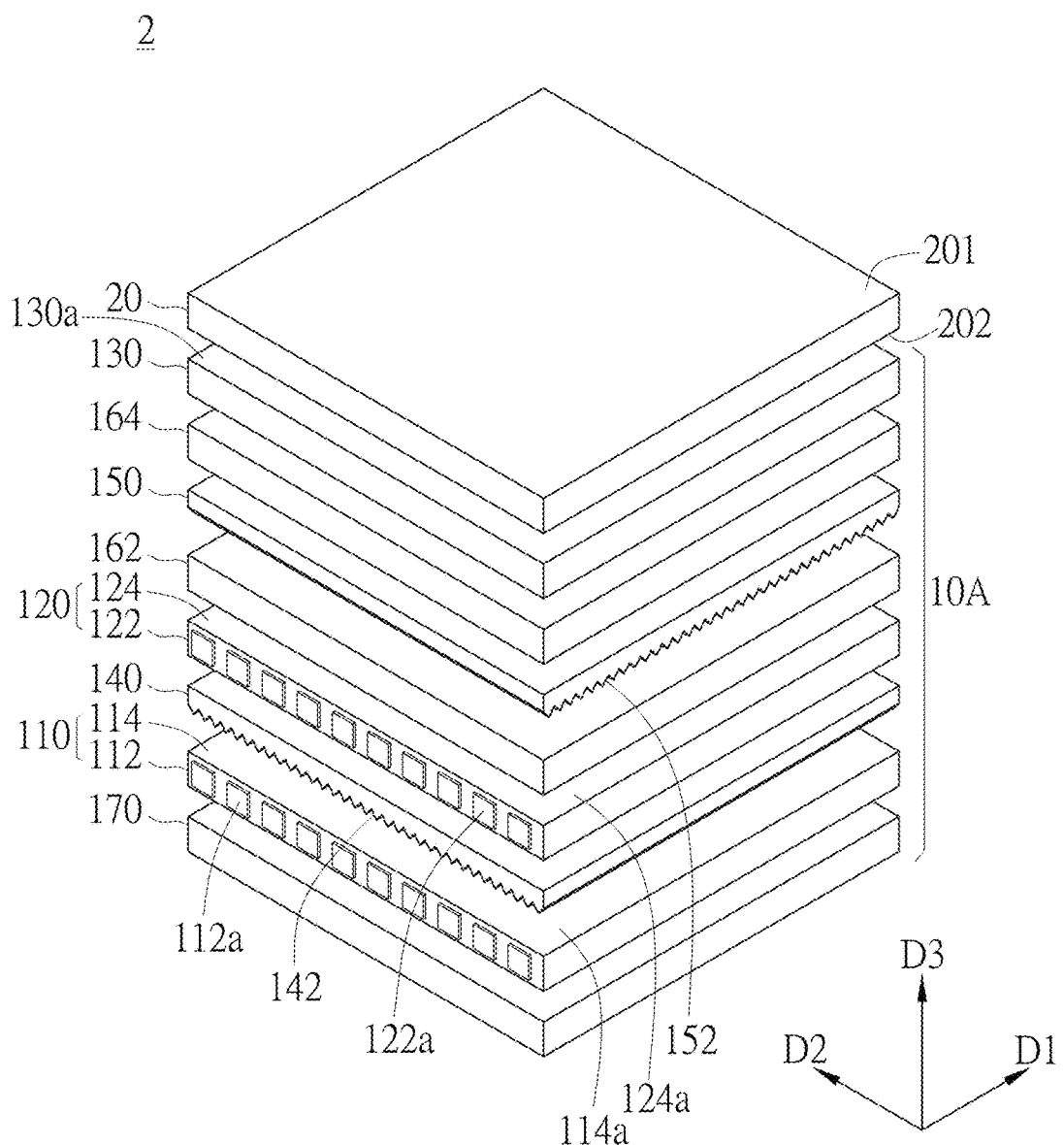
FIG. 2 is a schematic perspective view of the display device and the backlight module thereof in a second embodiment of the disclosure.
Figure 4:
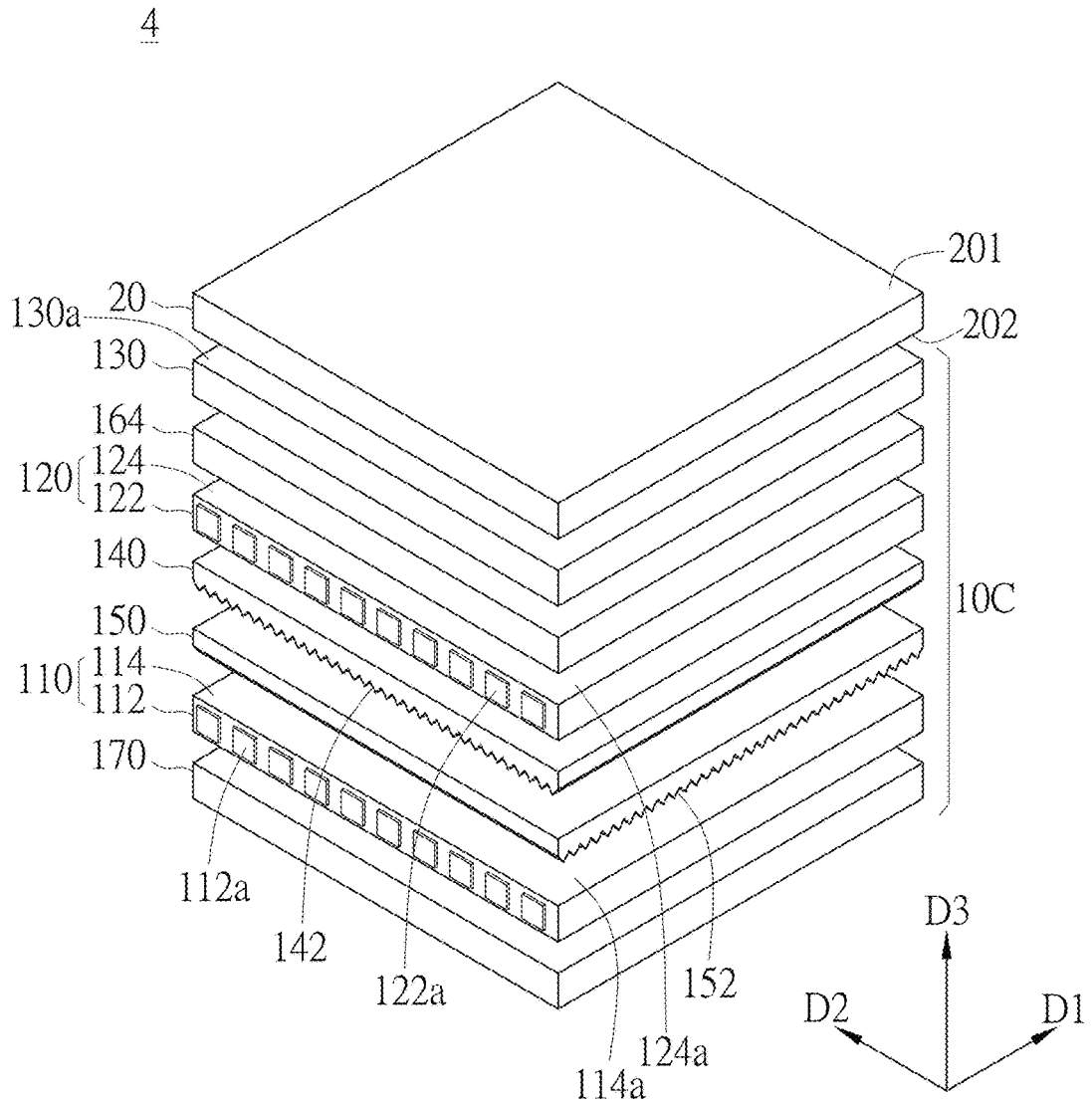
FIG. 4 is a schematic perspective view of the display device and the backlight module thereof in a fourth embodiment of the disclosure.
Figure 5:
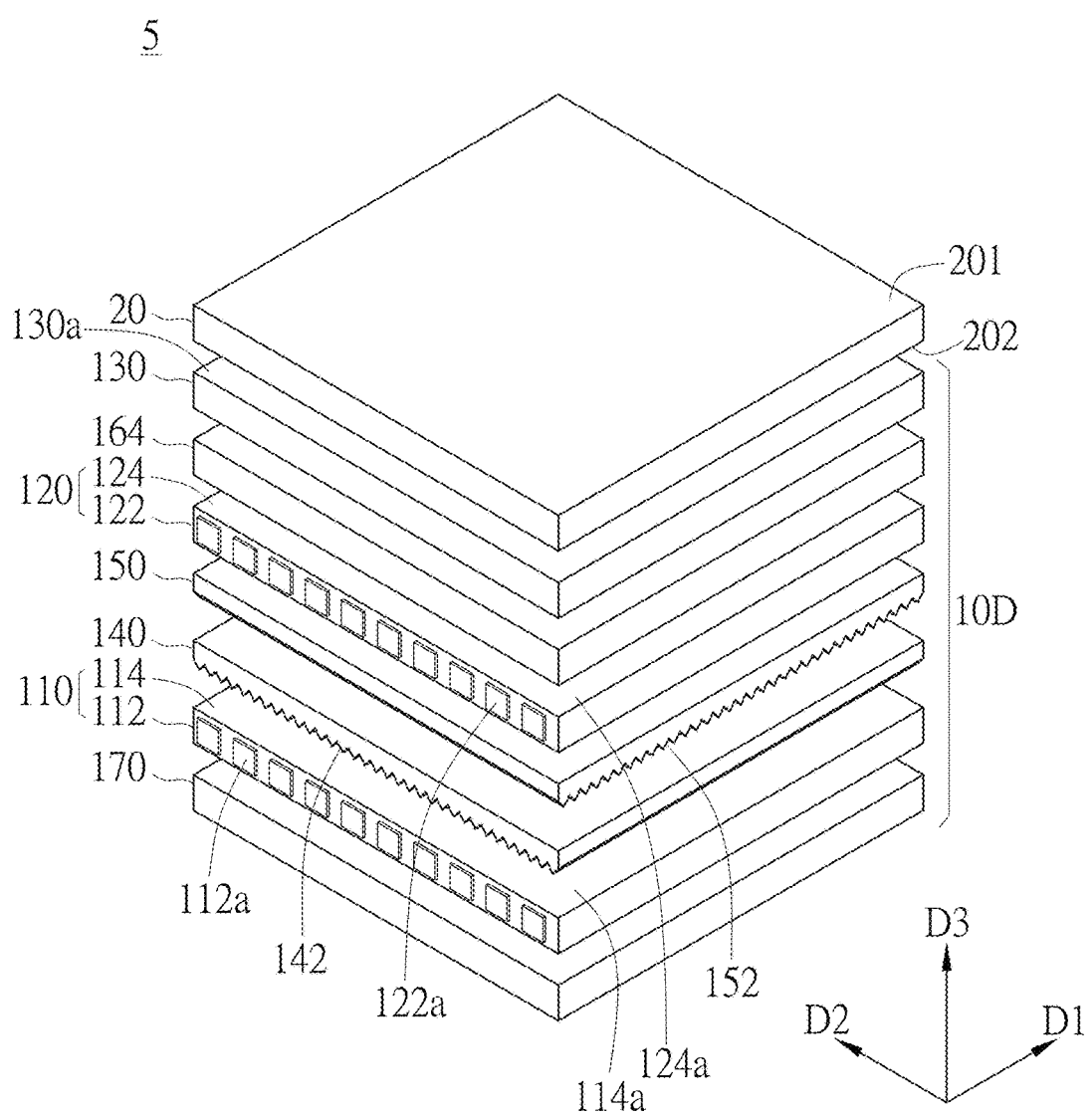
FIG. 5 is a schematic perspective view of the display device and the backlight module thereof in a fifth embodiment of the disclosure.

In practical applications, the backlight module of the disclosure can further include other optical components, so the backlight module can achieve the desired optical effect. Referring to FIG. 2, FIG. 2 is a schematic perspective view of the display device 2 and the backlight module 10A thereof in a second embodiment of the disclosure. In this embodiment, the display device 2 includes the display panel 20 and the backlight module 10A. The difference between the backlight module 10A and the backlight module 10 of FIG. 1 is that the backlight module 10A further includes a second prism film 150 to further enhance the intensity of light at the center of the backlight module 10A. In an embodiment, the second prism film 150 is preferably disposed at the light exit side 114a of the first light guide 114. As shown in FIG. 2, the second prism film 150 is disposed at the light exit side 124a of the second light guide 124 and located between the second light guide 124 and the switching control unit 130, but not limited thereto. In other embodiments, as shown in FIG. 4 and FIG. 5, the second prism film 150 can be disposed between the first light guide 114 and the second light guide 124.

The second prism film 150 has a plurality of second prism strips 152, which extend along the second direction D2. Specifically, the plurality of second prism strips 152 are disposed along the first direction D1 and extend along the second direction D2 to provide a better optical effect. For example, the plurality of second prism strips 152 of the second prism film 150 extending along the second direction D2 (e.g. horizontal viewing angle direction) are disposed at 0 degree to enhance the intensity of light at the center of the backlight module 10A.

As shown in FIG. 2, the backlight module 10A can further include a reflective layer 170, which is disposed at a side of the first light guide 114 opposite to the light exit side 114a. The reflective layer 170 is configured to reflect light toward the light exit side 114a of the first light guide 114 to improve the utilization of light, thereby increasing the light output brightness of the backlight module 10A.

The backlight module 10A can further include one or more optical films (e.g. 162, 164), which can be disposed at the light exit side 114a of the first light guide 114. The one or more optical films (e.g. 162, 164) are configured to enhance the optical effect of the backlight module 10A and preferably disposed at the light exit side 124a of the second light guide 124, for example, between the second light guide 124 and the switching control unit 130. In an embodiment, the one or more optical films can include an optical film 162, and the optical film 162 can be a diffusion film configured to enhance the uniformity of light. In this embodiment, as the diffusion film, the optical film 162 is disposed between the second light guide 124 and the switching control unit 130, and preferably between the second prism film 150 and the second light guide 124. Moreover, the one or more optical films can include an optical film 164, which is configured to enhance the brightness and visual effect. For example, the optical film 164 can be a dual brightness enhancement film (DBEF), an advanced light control film (ALCF), a diffusion film, etc. In this embodiment, the optical film 164 is disposed between the second light guide 124 and the switching control unit 130, and preferably between the second prism film 150 and the switching control unit 130.

Referring to FIG. 3, FIG. 3 is a schematic perspective view of the display device 3 and the backlight module 10B thereof in a third embodiment of the disclosure. In this embodiment, the display device 3 includes the display panel 20 and the backlight module 10B. The difference between the backlight module 10B and the backlight module 10A of FIG. 2 is that the arrangement of the first prism film 140 and the second prism film 150. In this embodiment, the first prism film 140 is disposed at the light exit side 124*a* of the second light guide 124 and located between the optical film 162 and the optical film 164. The second prism film 150 is disposed between the first light guide 114 and the second light guide 124. In the privacy mode, the second light source 122 is turned off, the first light source 112 is turned on, and the switching control unit 130 is activated to modulate light that passes the first prism film 140 from the first light source unit 110, so the backlight module 10B still has a more concentrated light output range (i.e., narrower viewing angle).

Referring to FIG. 4, FIG. 4 is a schematic perspective view of the display device 4 and the backlight module 10C thereof in a fourth embodiment of the disclosure. In this embodiment, the display device 4 includes the display panel 20 and the backlight module 10C. The difference between the backlight module 10C and the backlight module 10 of FIG. 1 is that the backlight module 10C further includes the reflective layer 170, the second prism film 150, and the optical film 164. Similar to the embodiment of FIG. 2, the reflective layer 170 is disposed at the side opposite to the light exit side 114*a* of the first light guide 114 and configured to reflect light toward the light exit side 114*a* of the first light guide 114, thereby increasing the utilization of light. The structure of the second prism film 150 can be similar to or the same as FIG. 2. In this embodiment, the second prism film 150 is disposed at the light exit side 114*a* of the first light guide 114 and located between the first light guide 114 and the second light guide 124. More specifically, the second prism film 150 is located between the first light guide 114 and the first prism film 140. In other words, the first prism film 140 is closer to the second light guide 124 than the second prism film 150 is, and the second prism film 150 is closer to the first light guide 114 than the first prism film 140 is. The optical film 164 is disposed between the second light guide 124 and the switching control unit 130. In the privacy mode, the second light source 122 is turned off, the first light source 112 is turned on, and the switching control unit 130 is activated to module the light that passes the second prism film 150 and the first prism film 140 from the first light source unit 110, so the backlight module 10C still has a more concentrated light output range (i.e., narrower viewing angle).

Referring to FIG. 5, FIG. 5 is a schematic perspective view of the display device 5 and the backlight module 10D thereof in a fifth embodiment of the disclosure. In this embodiment, the display device 5 includes the display panel 20 and the backlight module 10D. The difference between the backlight module 10D and the backlight module 10C of FIG. 4 is that the arrangement of the first prism film 140 and the second prism film 150. In this embodiment, the second prism film 150 is disposed between the first light guide 114 and the second light guide 124 and located between the first prism film 140 and the second light guide 124. In other words, the first prism film 140 is closer to the first light guide 114 than the second prism film 150 is, and the second prism film 150 is closer to the second light guide 124 than the first prism film 140 is. In the privacy mode, the second light source 122 is turn off, the first light source 112 is turned on, and the switching control unit 130 is activated to modulate the light that passes the first prism film 140 and the second prism film 150 from the first light source unit 110, so the backlight module 10D still has a more concentrated light output range (i.e., narrower viewing angle).

Figure 6:
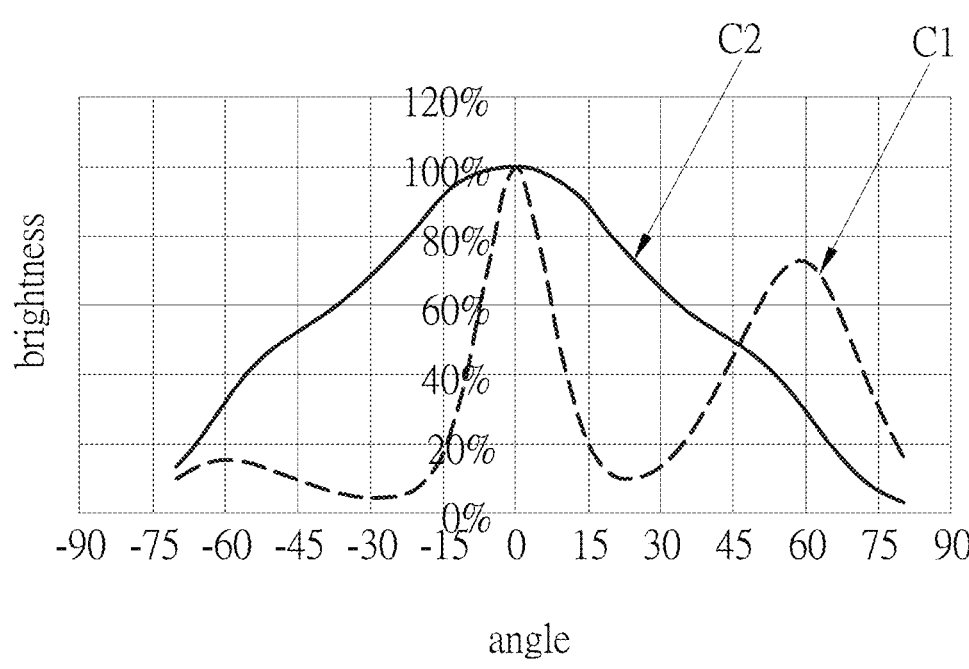
FIG. 6 is a schematic view of the brightness-angle curves of the backlight module of an embodiment of the disclosure and the conventional backlight module in the share mode.

FIG. 6 is a schematic view of the brightness-angle curves of the backlight module of an embodiment of the disclosure and the conventional backlight module in the share mode, wherein the curve C1 represents the brightness-angle curve of the conventional backlight module using the anti-peeping film, and the curve C2 represents the brightness-angle curve of the backlight module (e.g. 10A) of the disclosure. As shown in FIG. 6, in the share mode, the brightness-angle curve (e.g. C1) of the conventional backlight module is a curve with multiple peaks, wherein obvious peaks occur at the neighborhood of the viewing angles of 0 degree and 60 degrees, so the brightness of the conventional backlight module is decreased at the viewing angles of about 15 to 30 degrees and −15 to −60 degrees. In order to increase the brightness at the viewing angles of 15 to 30 degrees and −15 to −60 degrees, the conventional backlight module generally needs to increase the power of the light source, which is not conducive to energy saving. As shown in FIG. 6, in the share mode, the brightness-angle curve (e.g. C2) of the backlight module of the disclosure is substantially a smooth single peak curve with a maximum brightness at the viewing angle of about 0 degree, and the brightness thereof is gradually decreased toward the viewing angles of 60 degrees and −60 degrees to provide a much more uniform brightness-viewing angle distribution, which effectively improves the power consumption.

Figure 7A:
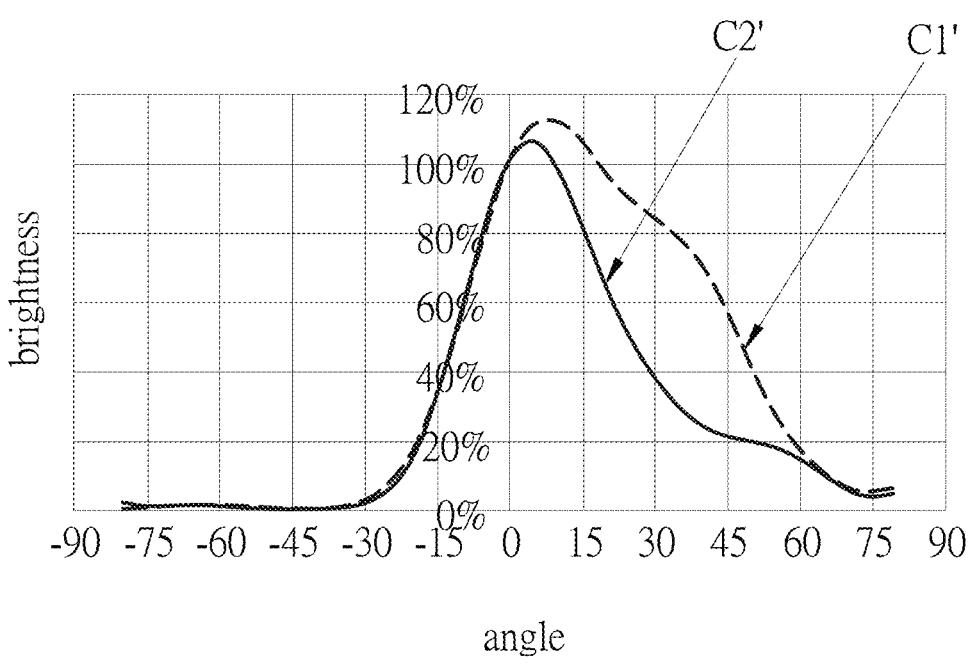
FIG. 7A is a schematic view of the brightness-angle curves of the backlight module of an embodiment of the disclosure and the conventional backlight module in the privacy mode.
Figure 7B:
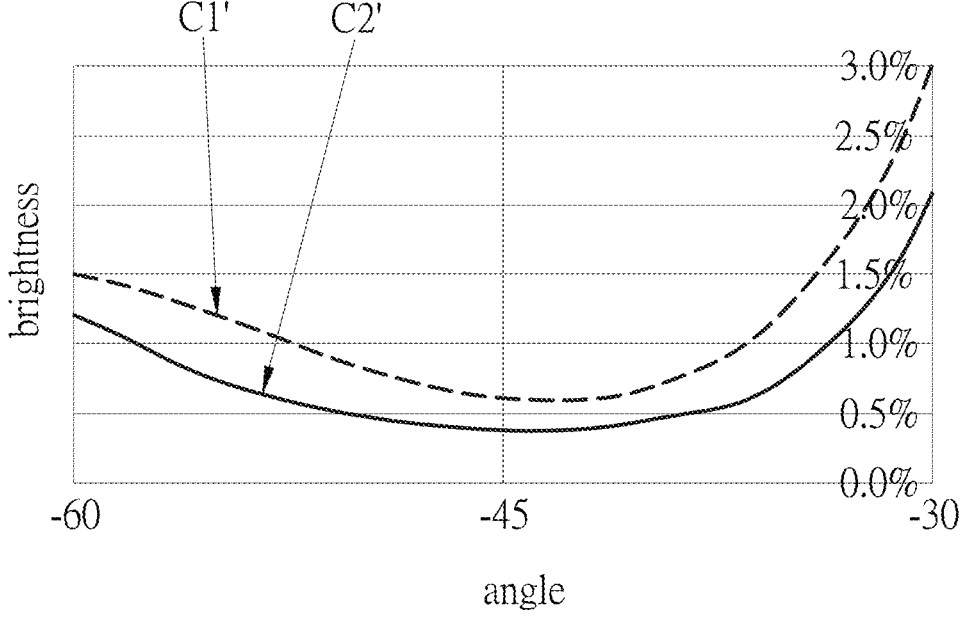
FIG. 7B is a partially enlarged view of FIG. 7A.

FIG. 7A is a schematic view of the brightness-angle curves of the backlight module of an embodiment of the disclosure and the conventional backlight module in the privacy mode, wherein the curve C1' represents the brightness-angle curve of the conventional backlight module using the anti-peeping film, and the curve C2' represents the brightness-angle curve of the backlight module (e.g. 10A) of the disclosure. A shown in FIG. 7A, in the privacy mode, the brightness-angle curve (e.g. C1') of the conventional the backlight module is a curve with a wider peak, so the conventional backlight module has a certain degree of brightness at the viewing angle of 15 to 45 degrees, which provides a poor anti-peeping effect. As shown in FIG. 7A, in the share mode, the brightness-angle curve (e.g. C2') of the backlight module of the disclosure is a curve with a narrower (or more concentrated) peak, so the brightness thereof at the viewing angle of 15 to 45 degrees is significantly reduced compared to the conventional backlight module, thereby providing a better anti-peeping effect. Moreover, please refer to FIG. 7B, which is a partially enlarged view of FIG. 7A to show the brightness-angle curves (e.g. C1', C2') at the viewing angle of −30 degrees to −60 degrees. As shown in FIG. 7B, at the viewing angle of −30 degrees to −60 degrees, the backlight module of the disclosure has a brightness lower than that of the conventional backlight module, so the backlight module of the disclosure has a superior anti-peeping effect over the conventional backlight module.

In an embodiment, the brightness ratio of the first light source 112 to the second light source 122 is preferably 2:1. In the share mode, the backlight module (e.g. 10A) of the disclosure can achieve approximately 50% of the brightness at the viewing angle of 45 degrees, but not limited thereto. In practical applications, the first light source 112 and the second light source 122 can have any suitable brightness ratio.

Figure 8:
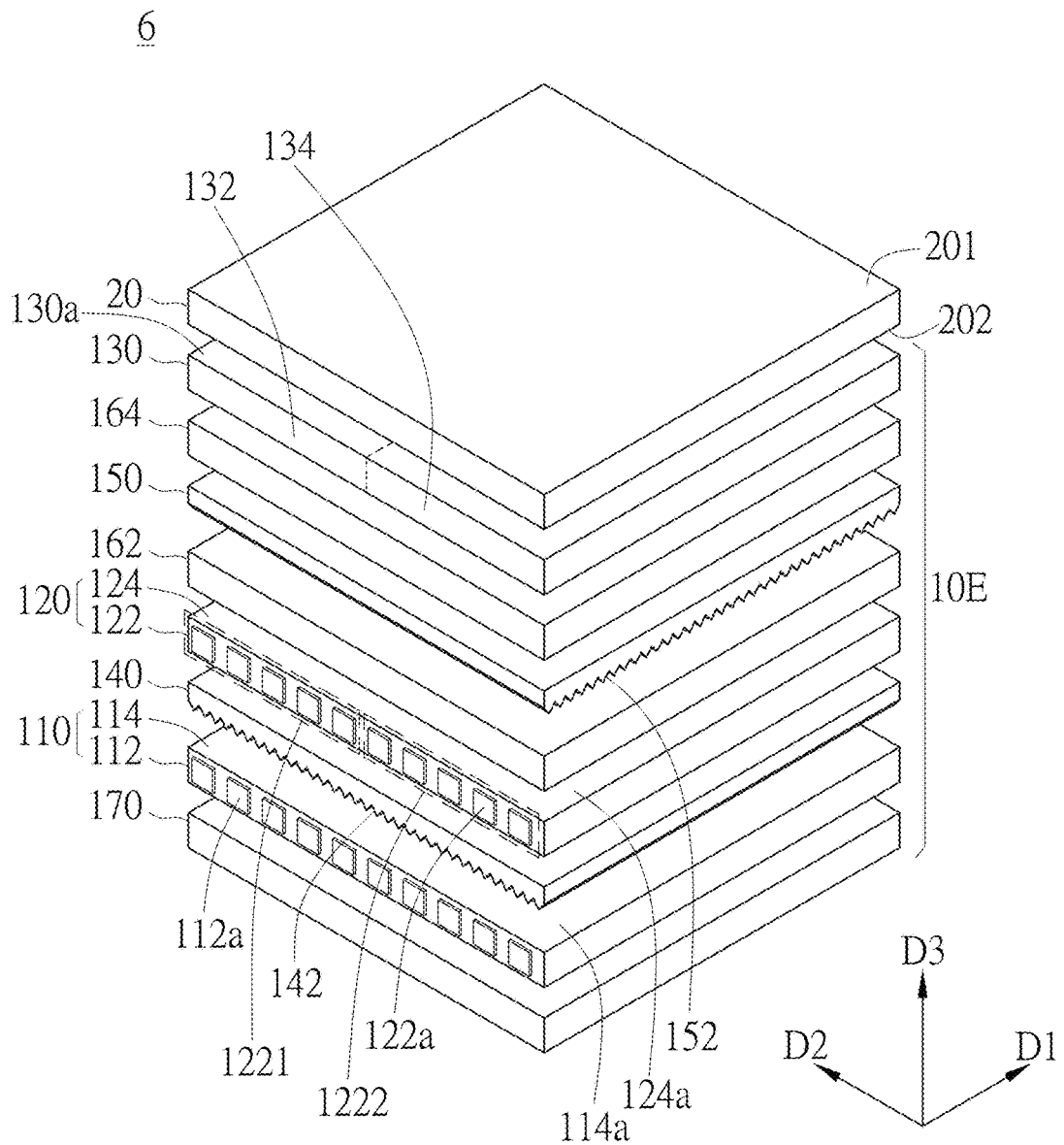
FIG. 8 is a schematic perspective view of the display device and the backlight module thereof in a six embodiment of the disclosure.

Moreover, by controlling the second light source 122 and the switching control unit 130, the backlight module of the disclosure can effectively provide an anti-peeping effect at a certain region. Referring to FIG. 8, FIG. 8 is a schematic perspective view of the display device 6 and the backlight module 10E thereof in a six embodiment of the disclosure. In this embodiment, the display device 6 includes the display panel 20 and the backlight module 10E. The backlight module 10E has a configuration similar to the backlight module 10A but different in the design of the second light source 122 and the switching control unit 130. Specifically, the switching control unit 130 has a first modulation region 132 and a second modulation region 134, and the second light source 122 includes a first sub-light source 1221 and a second sub-light source 1222. The first sub-light source 1221 and the second sub-light source 1222 correspond to the first modulation region 132 and the second modulation region 134, respectively. For example, the plurality of light-emitting components (e.g. 122a) of the second light source 122 can be grouped into the first sub-light source 1221 and the second sub-light source 1222. The first sub-light source 1221 and the second sub-light source 1222 can be independently controlled to be turned on or off. Similarly, the switching control unit 130 can be independently activated or deactivated at the first modulation region 132 and the second modulation region 134.

Figures 1, 8A:
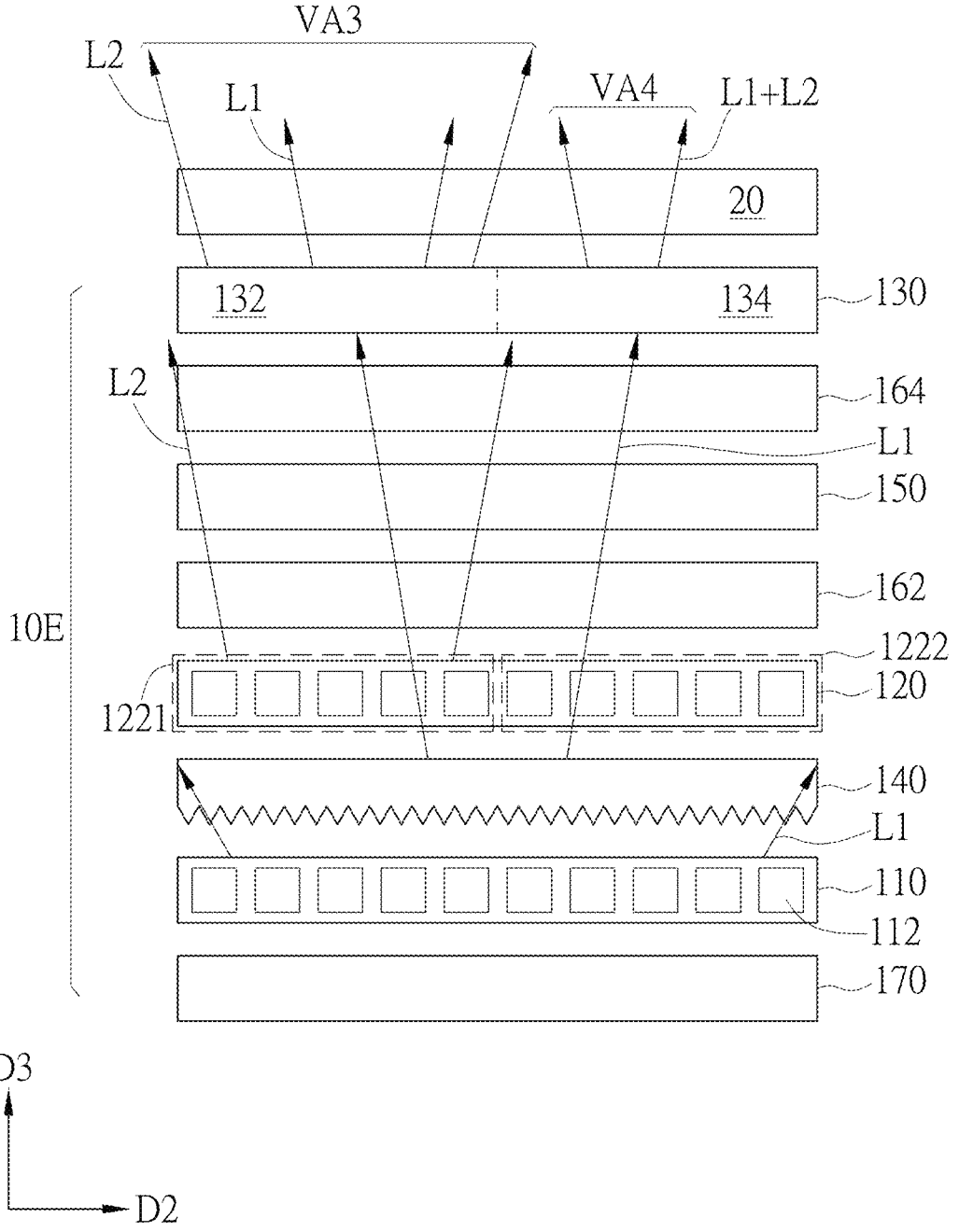
Figures 2, 8A:
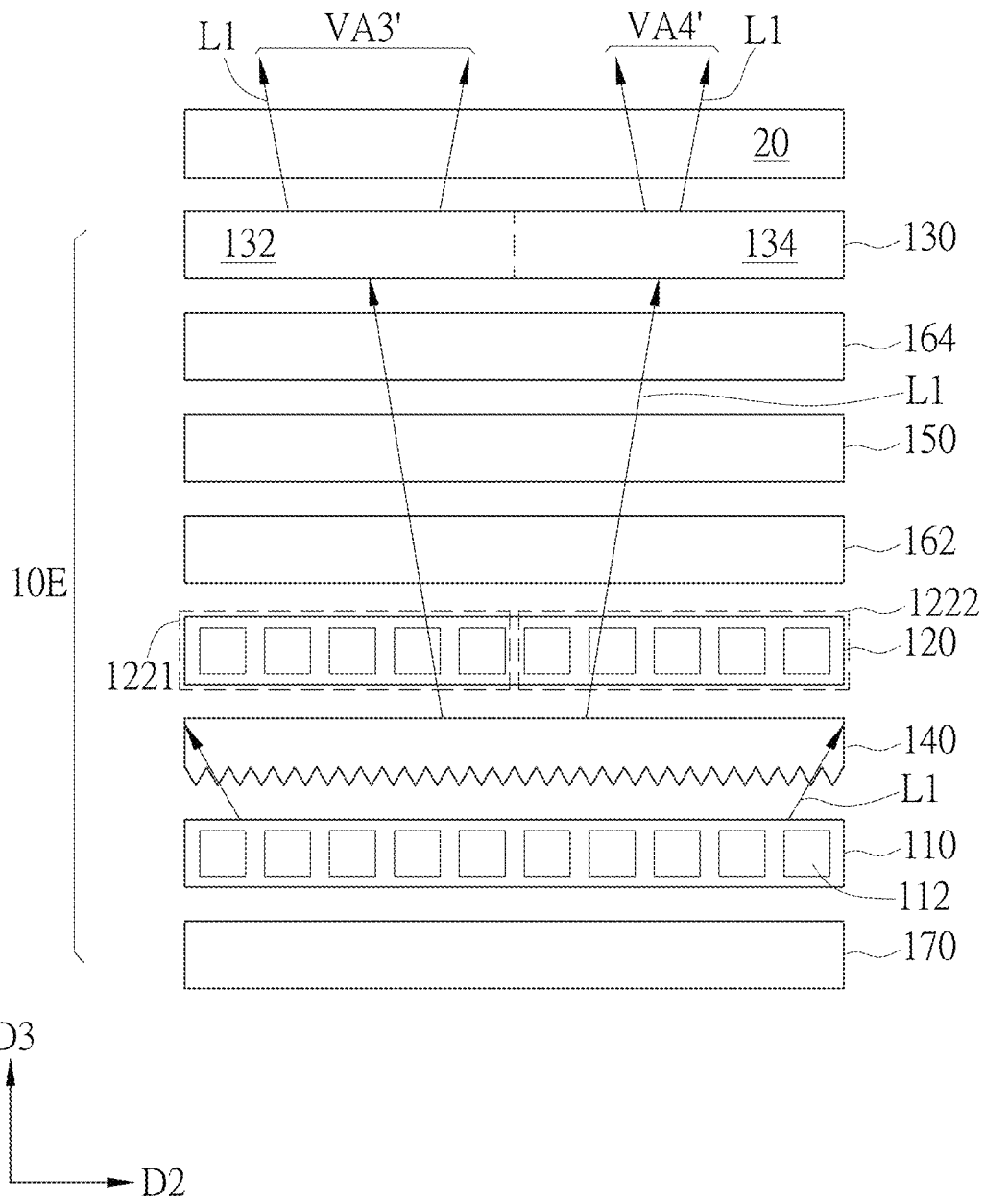

Referring to FIG. 8A-1 and FIG. 8A-2, FIG. 8A-1 and FIG. 8A-2 are schematic views of the light output range of the display device 6 and the backlight module 10E thereof in different partial privacy modes. As shown in FIG. 8A-1, in the partial privacy mode, the first light source 112 is turned on, the first sub-light source 1221 is selectively turned on or off (turned on in FIG. 8A-1), the second sub-light source 1222 is turned off, and the switching control unit 130 is deactivated at the first modulation region 132 and activated at the second modulation region 134, so the backlight module 10E has a share light output range (e.g. the third light output range VA3) substantially corresponding to the first modulation region 132 and a privacy light output range (e.g. the fourth light output range VA4) substantially corresponding to the second modulation region 134. The privacy light output range is smaller than the share light output range. Specifically, in the partial privacy mode of FIG. 8A-1, the first light source 112 is turned on to emit light L1, the first sub-light source 1221 of the second light source 122 can be turned on or off, and the second sub-light source 1222 is turned off. In this embodiment, the first sub-light source 1221 is preferably turned on to increase the viewing angle in the share region. For example, the first sub-light source 1221 is turned on to increase the third light output range VA3 in the region corresponding to the first modulation region 132. The light L1 of the first light source 112 is directed by the first light guide 114 toward the light output direction (e.g. the third direction D3) into the first prism film 140. With the light concentration function of the first prism film 140, the light L1 enters the switching control unit 130 via the optical films 162/164 and the second prism film 150 in a more concentrated manner. In the partial privacy mode, the light L2 of the first sub-light source 1221 enters the switching control unit 130 via the optical films 162/164 and the second prism film 150. The switching control unit 130 is deactivated at the first modulation region 132 and activated at the second modulation region 134, so lights L1 and L2 toward the first modulation region 132 pass the first modulation region 132 in a substantially non-modulated manner to form the share light output range (e.g. the third light output range VA3), which substantially corresponds to the first modulation region 132 and has a relatively larger (or wider) viewing angle. At the same time, light L1 (and light L2, if any) toward the second modulation region 134 is modulated at the second modulation region 134 to form the privacy light output range (e.g. the fourth light output range VA4), which substantially corresponds to the second modulation region 134 and has a relatively smaller (or narrower) viewing angle. Consequently, the share light output range (e.g. the third light output range VA3) of the backlight module 10E substantially corresponds to the first modulation region 132, and the privacy light output range (e.g. the fourth light output range VA4) of the backlight module 10E substantially corresponds to the second modulation region 134. In other words, the backlight module 10E has a wider viewing angle at one side (e.g. the side of the first modulation region 132) and a narrower viewing angle at another side (e.g. the side of the second modulation region 134) to exhibit a partial share and partial privacy light output effect, but not limited thereto.

In the above embodiment, the first sub-light source 1221 is preferably turned on to increase the viewing angle in the share region, but not limited thereto. When the first light source 112 has a luminance high enough to match the needs, the first sub-light source 1221 can be turned off. As shown in FIG. 8A-2, in the partial privacy mode, the first light source 112 is turned on to emit light L1; the first sub-light source 1221 and the second sub-light source 1222 of the second light source 122 are turned off. The light L1 of the first light source 112 is directed by the first light guide plate 114 toward the light output direction (e.g. the third direction D3) into the first prism film 140. With the light concentration function of the first prism film 140, the light L1 enters the switching control unit 130 via the optical films 162/164 and the second prism film 150 in a more concentrated manner. In the partial privacy mode, the switching control unit 130 is deactivated at the first modulation region 132 and activated at the second modulation region 134, so a portion of light L1 toward the first modulation region 132 passes the first modulation region 132 in a substantially non-modulated manner to form the share light output range (e.g. the third light output range VA3'), which substantially corresponds to the first modulation region 132 and has a relatively larger (or wider) viewing angle. At the same time, another portion of light L1 toward the second modulation region 134 is modulated at the second modulation region 134 to form the privacy light output range (e.g. the fourth light output range VA4'), which substantially corresponds to the second modulation region 134 and has a relatively smaller (or narrower) viewing angle. Consequently, the share light output range (e.g. the third light output range VA3') of the backlight module 10E substantially corresponds to the first modulation region 132, and the privacy light output range (e.g. the fourth light output range VA4') of the backlight module 10E substantially corresponds to the second modulation region 134. In other words, the backlight module 10E has a wider viewing angle at one side (e.g. the side of the first modulation region 132) and a narrower viewing angle at another side (e.g. the side of the second modulation region 134) to exhibit a partial share and partial privacy light output effect, but not limited thereto.

In the embodiments of FIG. 8A-1 and FIG. 8A-2, in order to explain the relative size of the viewing angle, the third light output range VA3 (or VA3') and the fourth light output range VA4 (or VA4') are illustrated not overlapping with each other, but not limited thereto. In practical applications, the third light output range VA3 (or VA3') and the fourth light output range VA4 (or VA4') may partially overlap with each other, and the third light output range VA3 (or VA3') and the fourth light output range VA4 (or VA4') together constitute the overall light output range of the backlight module 10E in the partial privacy mode, wherein the portion corresponding to the first modulation region 132 has a wider viewing angle, and the portion corresponding to the second modulation region 134 has a narrower viewing angle. Moreover, in the embodiment of FIG. 8A-1, since the first sub-light source 1221 is turned on, the third light output range VA3 is larger than the third light output range VA3' in the embodiment of FIG. 8A-2 with the first sub-light source being turned off. In other words, in the share region (e.g. the region corresponding to the first modulation region 132), the viewing angle of FIG. 8A-1 is larger than the viewing angle of FIG. 8A-2.

In another partial privacy mode (not shown), by turning-on the first light source 112, turning-off the first sub-light source 1221, selectively turning-on or turning-off the second sub-light source 1222, and controlling the switching control unit 130 to be activated at the first modulation region 132 and deactivated at the second modulation region 134, the backlight module 10E can have a share light output range (e.g. the third light output range VA3) substantially corresponding to the second modulation region 134 and a privacy light output range (e.g. the fourth light output range VA4) substantially corresponding to the first modulation region 132.

Figure 8B:
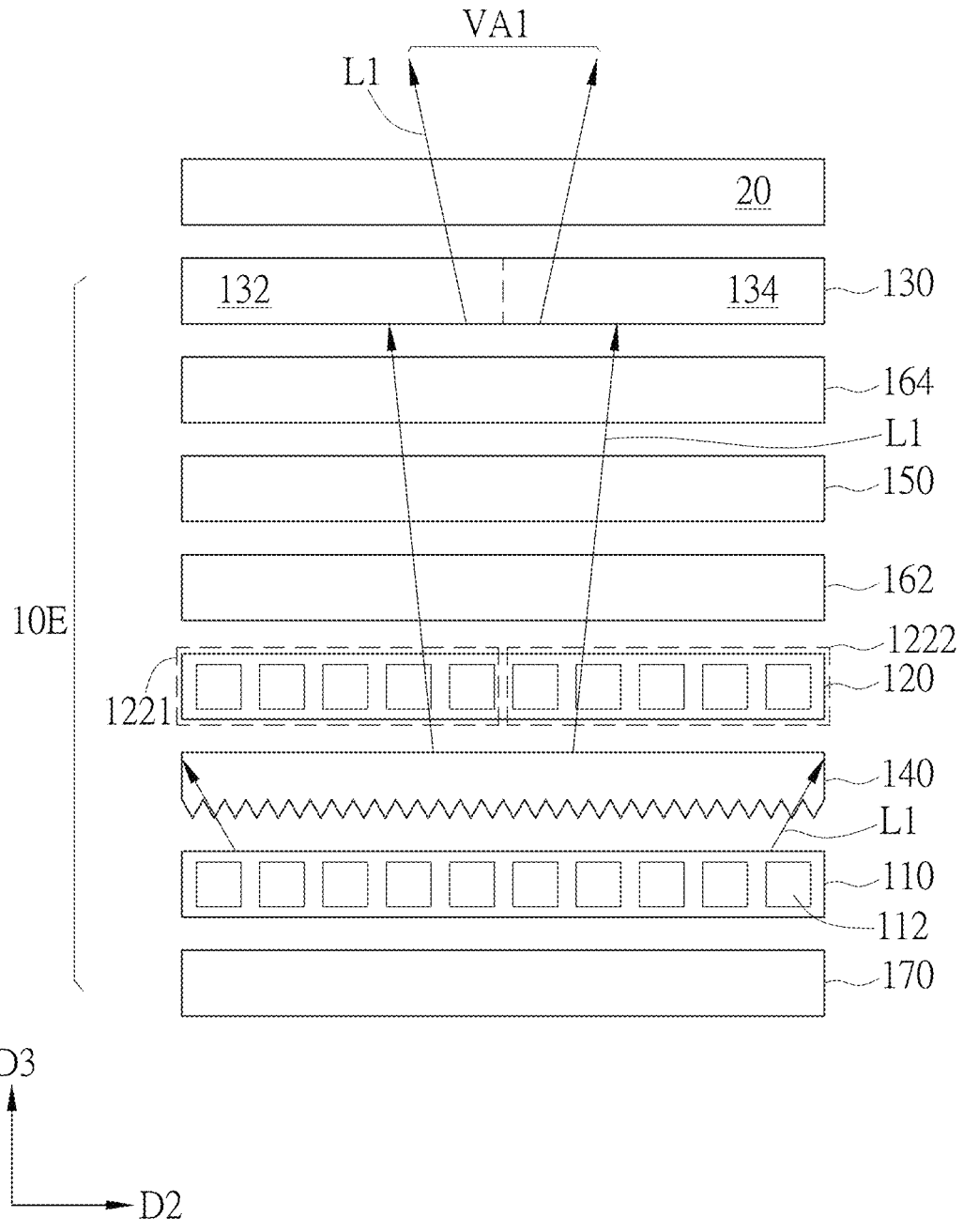
FIG. 8B and FIG. 8C are schematic views of the light output range of the display device and the backlight module thereof of FIG. 8 in the privacy mode and the share mode, respectively.

In addition, the display device 6 of FIG. 8 and the backlight module 10E thereof can be controlled to have the light output range similar to the privacy mode and the share mode in the previous embodiments. As shown in FIG. 8B, in the privacy mode, the first sub-light source 1221 and the second sub-light source 1222 of the second light source 122 are turned off, and the first light source 112 is turned on. Light L1 of the first light source 112 is directed by the first light guide 114 toward the light output direction (e.g. the third direction D3) into the first prism film 140. With the light concentration function of the first prism film 140, the light L1 enters the switching control unit 130 in a more concentrated manner. In the privacy mode, the switching control unit 130 is activated at the first modulation region 132 and the second modulation region 134 to modulate the light L1 of the first light source unit 110 that passes the first prism film 140, so the backlight module 10E will have first light output range VA1, which is more concentrated and has a narrower viewing angle.

Figure 8C:
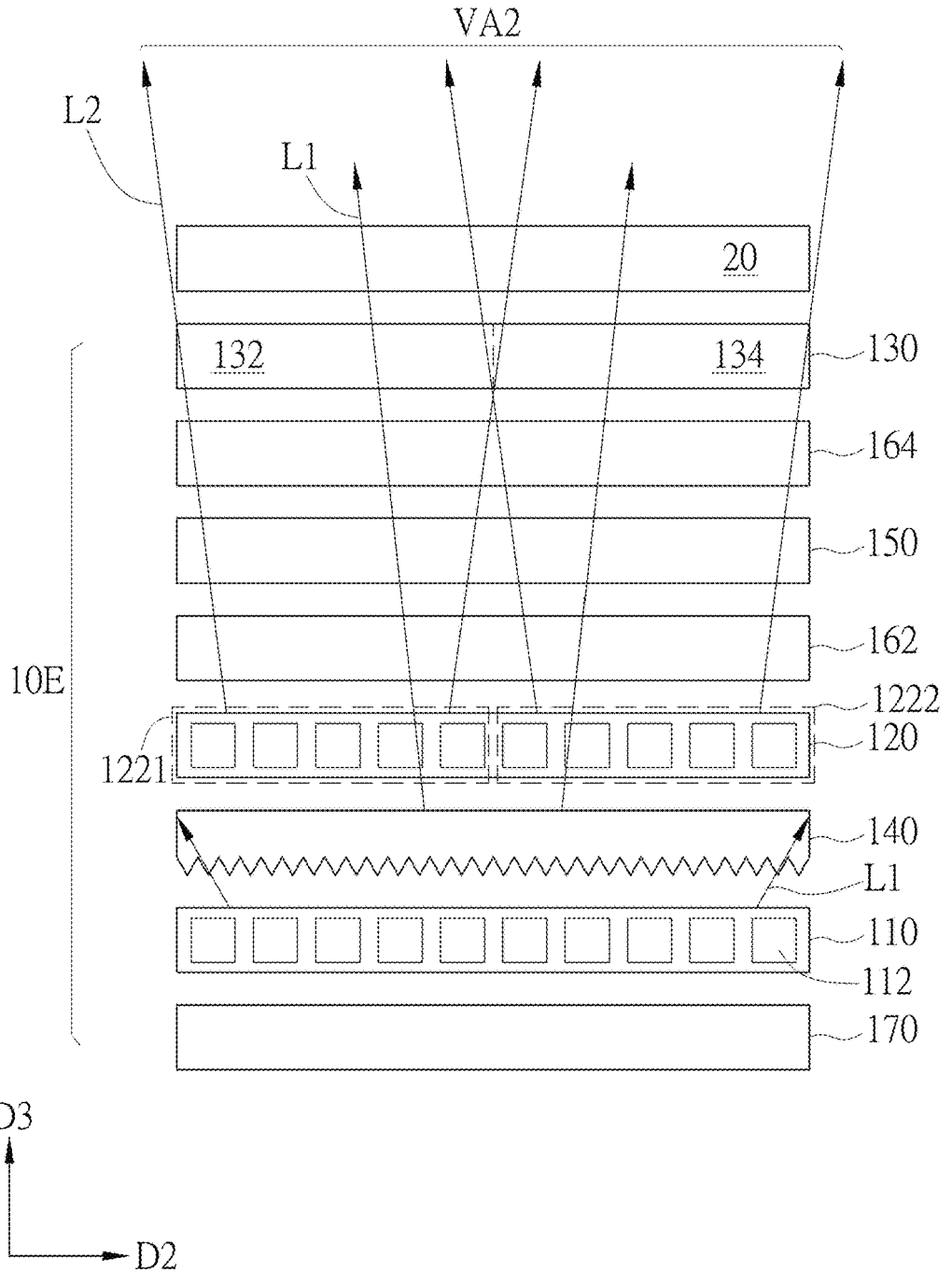

As shown in FIG. 8C, in the share mode, the first sub-light source 1221 and the second sub-light source 1222 of the second light source 122 are turned on, and the first light source 112 can be turned on or turned off. In this embodiment, the first light source 112 is preferably turned on to increase the light output brightness of the backlight module 10E. Light L1 of the first light source 112 is directed by the first light guide 114 toward the light output direction (e.g. the third direction D3) into the first prism film 140. With the light concentration function of the first prism film 140, the light L1 enters the switching control unit 130 in a more concentrated manner. Light L2 of the second light source 122 is directed by the second light guide 124 toward the light output direction (e.g. the third direction D3) into the switching control unit 130. In the share mode, the switching control unit 130 is deactivated not to modulate the light L2 of the second light source unit 120 and the light L1 passing the first prism film 140 from the first light source unit 110, so the backlight module 10E will have the second light output range VA2, which is more diffused and has a wider viewing angle.

Figures 9A, 9B:
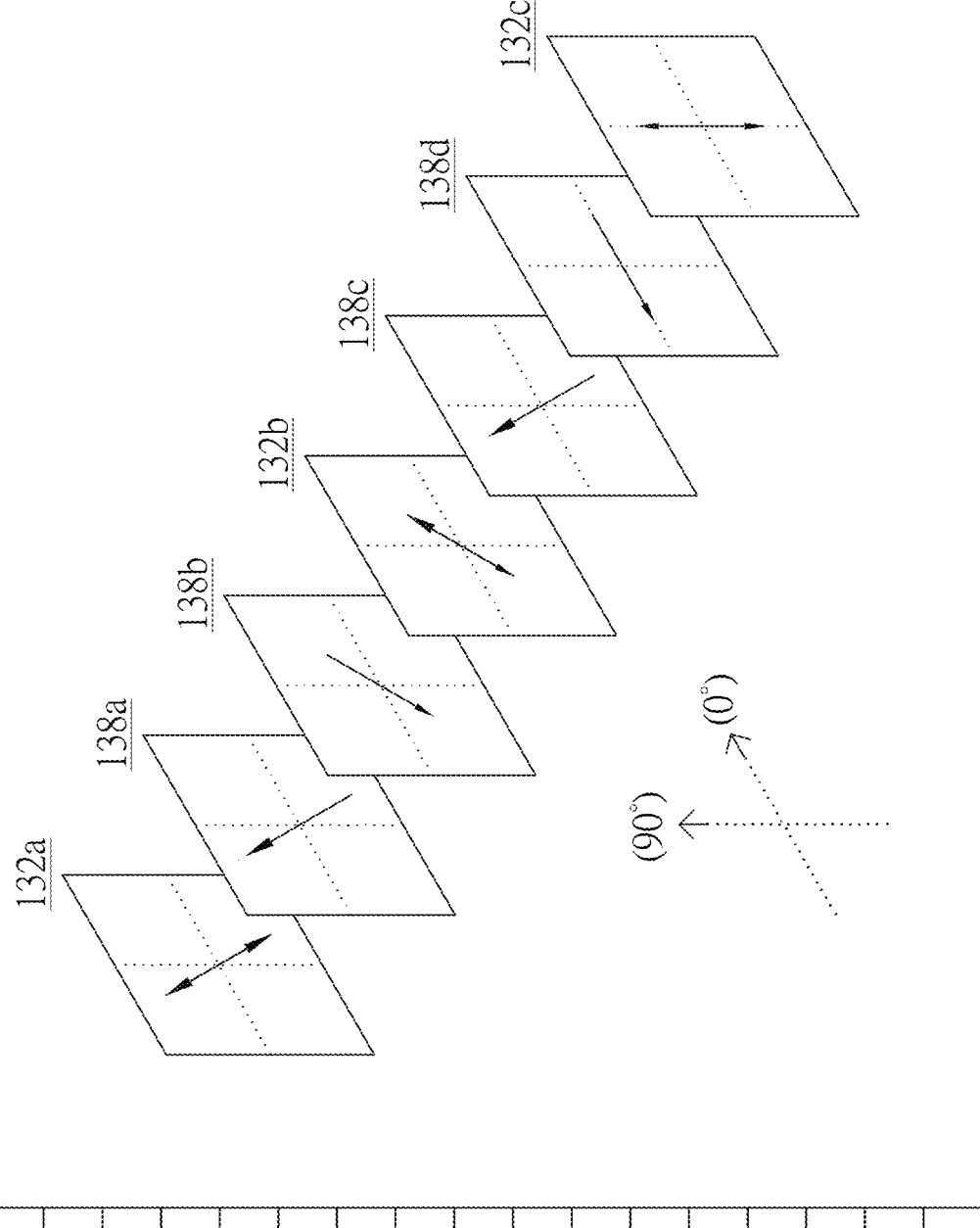
FIG. 9A is a schematic view of the switching control unit in an embodiment of the disclosure.
FIG. 9B is a schematic view of alignment of certain components of the switching control unit of FIG. 9A.

Referring to FIG. 9A and FIG. 9B, FIG. 9A is a schematic view of the switching control unit 130 in an embodiment of the disclosure, and FIG. 9B is a schematic view of alignment of certain components (e.g. polarizer film, alignment layer) of the switching control unit 130 of FIG. 9A. As shown in FIG. 9A and FIG. 9B, the switching control unit 130 can be a viewing angle control (VAC) unit. In an embodiment, the switching control unit 130 is preferably a liquid crystal (LC) VAC unit, such as dual LC-VAC unit, which along the light output direction (e.g. the first direction D3) sequentially includes a first polarizer film 132a, a first substrate 134a, a first electrode 136a, a first alignment layer 138a, a first liquid crystal layer 135a, a second alignment layer 138b, a second electrode 136b, a second substrate 134b, a second polarizer film 132b, a third substrate 134c, a third electrode 136c, a third alignment layer 138c, a second liquid crystal layer 135b, a fourth alignment layer 138d, a fourth electrode 136d, a fourth substrate 134d, and a third polarizer film 132c. In an embodiment, the first substrate 134a, the second substrate 134b, the third substrate 134c, and the fourth substrate 134d are preferably transparent substrates, such as glass substrate, but not limited thereto. In another embodiment, the first substrate 134a, the second substrate 134b, the third substrate 134c, and the fourth substrate 134d can be polymer substrates.

As shown in FIG. 9B, in this embodiment, the polarizing angle of the first polarizer film 132a is preferably 115 degrees, the polarizing angle of the second polarizer film 132b is preferably 205 degrees, and the polarizing angle of the third polarizer film 132c is preferably 90 degrees. The first electrode 136a, the second electrode 136b, the third electrode 136c, and the fourth electrode 136d are preferably electrodes made of transparent materials, such as indium tin oxide (ITO) electrodes. The alignment angle of the first alignment layer 138a is preferably 115 degrees, the alignment angle of the second alignment layer 138b is preferably 205 degrees, the alignment angle of the third alignment layer 138c is preferably 115 degrees, and the alignment angle of the fourth alignment layer 138d is preferably 180 degrees. In the privacy mode, by applying voltage to the switching control unit 130, the switching control unit 130 is activated to have the function of modulating the viewing angle of light. In the share mode, no voltage is applied to the switching control unit 130, so the switching control unit 130 is deactivated and does not have the function of modulating the viewing angle of light. In the partial privacy mode, by applying the voltage to a certain modulation region of the switching control unit 130 (e.g. one of the first modulation region 132 and the second modulation region 134), the switching control unit 130 is partially activated to have the function of modulating the viewing angle of light at the activated modulation region, and no voltage is applied to another modulation region of the switching control unit 130 (such as the other of the first modulation region 132 and the second modulation region 134), so the switching control unit 130 is partially deactivated and does not have the function of modulating the viewing angle of light at the deactivated modulation region. Consequently, the light output range substantially corresponding to the activated modulation region that has voltage applied thereto is relatively smaller (or the viewing angle is relatively narrower) to effectively achieve the local anti-peeping effect.

It is noted that in the partial privacy mode, the number of the modulation regions of the switching control unit 130 preferably corresponds to the number of the sub-light sources of the second light source 122 and can be two or more to achieve the local anti-peeping effect at one or more regions.

Although the preferred embodiments of the invention have been described herein, the above description is merely illustrative. The preferred embodiments disclosed will not limit the scope of the invention. Further modification of the invention herein disclosed will occur to those skilled in the respective arts and all such modifications are deemed to be within the scope of the invention as defined by the appended claims.

What is claimed is:

1. A backlight module, comprising:
a switching control unit;
a first light source unit disposed below the switching control unit, the first light source unit comprising a first light source and a first light guide;
a second light source unit disposed between the switching control unit and the first light source unit, the second light source unit comprising a second light source and a second light guide; and
a first prism film disposed at a light exit side of the first light guide,
wherein in a privacy mode, the second light source is turned off, the first light source is turned on, and the switching control unit is activated to modulate light passing the first prism film from the first light source unit, so the backlight module has a first light output range;
in a share mode, the second light source is turned on, and the switching control unit is deactivated, so the backlight module has a second light output range larger than the first light output range,
wherein the second light source comprises a first sub-light source and a second sub-light source; the switching control unit comprises a first modulation region and a second modulation region corresponding to the first sub-light source and the second sub-light source, respectively; in a partial privacy mode, the first light source is turned on, the first sub-light source is selectively turned on or off, the second sub-light source is turned off, and the switching control unit is deactivated at the first modulation region and activated at the second modulation region, so the backlight module has a third light output range substantially corresponding to the first modulation region and a fourth light output range substantially corresponding to the second modulation region; the fourth light output range is smaller than the third light output range.

2. The backlight module of claim 1, wherein in the share mode, the first light source is turned on, and the second light output range is constituted by lights from the first light source unit and the second light source unit.

3. The backlight module of claim 1, wherein the first prism film has a plurality of first prism strips extending along a first direction.

4. The backlight module of claim 3, further comprising a second prism film, wherein the second prism film has a plurality of second prism strips extending along a second direction; the second direction is substantially perpendicular to the first direction.

5. The backlight module of claim 4, wherein the second prism film is disposed at the light exit side of the first light guide and located between the first light guide and the second light guide.

6. The backlight module of claim 4, wherein the second prism film is disposed at a light exit side of the second light guide.

7. The backlight module of claim 1, further comprising a reflective layer disposed at a side of the first light guide opposite to the light exit side.

8. The backlight module of claim 1, further comprising an optical film disposed at the light exit side of the first light guide.

9. The backlight module of claim 1, wherein in the partial privacy mode, the first sub-light source is turned on to increase the third light output range.

10. The backlight module of claim 1, wherein a brightness ratio of the first light source to the second light source is 2:1.

11. A display device, comprising:
a display panel having a display surface; and
the backlight module of claim 1 disposed at a side of the display panel opposite to the display surface.

12. A backlight module, comprising:
a switching control unit having a first modulation region and a second modulation region;
a first light source unit disposed below the switching control unit, the first light source unit comprising a first light source and a first light guide;
a second light source unit disposed between the switching control unit and the first light source unit, the second light source unit comprising a second light source and a second light guide, the second light source comprising a first sub-light source and a second sub-light source corresponding to the first modulation region and the second modulation region, respectively; and
a first prism film disposed at a light exit side of the first light guide,
wherein in a partial privacy mode, the first light source is turned on, the first sub-light source is selectively turned on or off, the second sub-light source is turned off, and the switching control unit is deactivated at the first modulation region and activated at the second modulation region, so the backlight module has a share light output range substantially corresponding to the first modulation region and a privacy light output range substantially corresponding to the second modulation region, and the privacy light output range is smaller than the share light output range.

13. The backlight module of claim 12, wherein the first prism film has a plurality of first prism strips extending along a first direction.

14. The backlight module of claim 13, further comprising a second prism film, wherein the second prism film has a plurality of second prism strips extending along a second direction; the second direction is substantially perpendicular to the first direction.

15. The backlight module of claim 14, wherein the second prism film is disposed at the light exit side of the first light guide and located between the first light guide and the second light guide.

16. The backlight module of claim 14, wherein the second prism film is disposed at a light exit side of the second light guide.

17. The backlight module of claim 12, further comprising a reflective layer disposed at a side of the first light guide opposite to the light exit side.

18. The backlight module of claim 12, further comprising an optical film disposed at the light exit side of the first light guide.

19. The backlight module of claim 12, wherein in the partial privacy mode, the first sub-light source is turned on to increase the share light output range.

\* \* \* \* \*